H. HELM.
Car Wheel.
No. 50,823.
Patented Nov. 7, 1865.
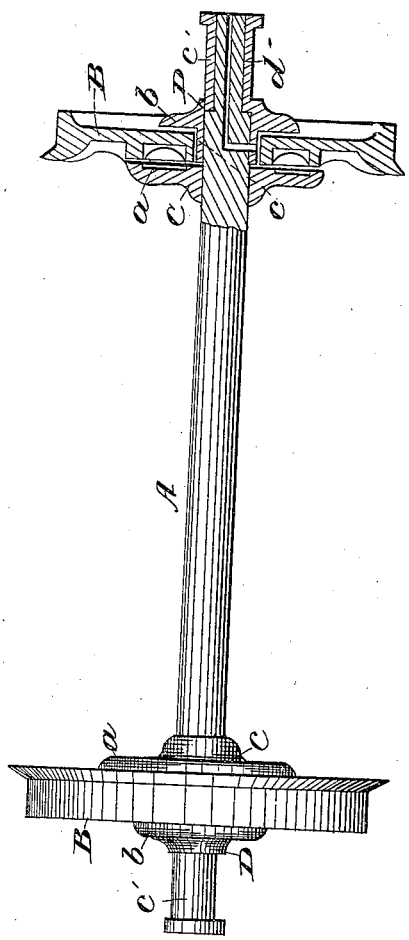
Witnesses
Inventor

UNITED STATES PATENT OFFICE.

HENRY HELM, OF ALLEGHENY CITY, PENNSYLVANIA.

IMPROVED MODE OF ADJUSTING CAR-WHEELS UPON AXLES.

Specification forming part of Letters Patent No. 50,823, dated November 7, 1865.

*To all whom it may concern:*

Be it known that I, HENRY HELM, of Allegheny City, in the county of Allegheny and State of Pennsylvania, have invented a new and useful Improvement in Adjusting Car-Wheels upon their Axles; and I do hereby declare that the following is a full, clear, and exact description thereof, which will enable those skilled in the art to make and use the same, reference being had to the accompanying drawing, forming part of this specification.

The drawing represents a view of an axle with its wheels fitted upon it according to my invention, one of the wheels and a portion of the axle being in section.

This invention relates to a novel way of applying car-wheels to their axles, whereby the advantage attending the securing of the wheels permanently on the axle and having the latter rotate—the usual plan—are obtained, as well as those attending the placing the wheels loosely on a fixed axle, or one which does not rotate, while the disadvantages of both modes are avoided.

A represents a car-axle, which is of wrought-iron, and B are the wheels, which are of cast-iron.

C C represent tubes, which are provided with a circular flange, $a$, at their outer ends, to serve as stays or bearings at the inner sides of the wheels. These tubes and flanges are of cast-iron, cast in one piece, and the tubes are forced on the axle, so as to be firmly connected thereto and rotate therewith in the same way as ordinary car-wheels are secured on their axles.

D D are tubes, provided with flanges $b$ at their inner ends, to serve as stays or bearings for the outer sides of the wheels. These tubes and flanges are also of cast-iron, cast in one piece, and they are forced tightly on the axle, like the tubes C. These tubes D have two journals, $c\ c'$, one of which, $c$, is larger in diameter than the other, $c'$.

The wheels B are fitted on the journals $c$, and the journals $c'$ are fitted in the usual bearings. The journals $c$ are kept properly lubricated by having a passage, $d$, in the ends of the axle, as plainly shown in the drawing, oil passing from the stuffing-boxes through said passages. The journals $c'$ are lubricated in the usual way.

This arrangement, it will be seen, is a combination of two principles heretofore used separately, namely—that in which the wheels are fast to the axle and all turn together like rollers, and that in which the axle is stationary and the wheels turn upon it. The former plan runs easier, because there is less friction than when the axle is stationary. Besides that, they offer greater facilities for lubricating and are not apt to become loose by wear. The latter plan—the fixed axle and loose wheels—possesses the advantage of allowing the two wheels to rotate with different speeds when passing over curves, thereby avoiding the drag and slip attending the wheels fixed on a rotating axle. The advantages of both plans are obtained by my invention and the disadvantages of both avoided.

In my improvement the outer and smaller journals, $c'$, being the smallest in diameter, work with less friction than the others, $c$. Consequently the axle will rotate when the wheels are running over a straight track; but when passing over a curve one wheel will turn independently of the other on the journals $c$, just so much as to compensate for the difference in the length of rail-surface the two wheels pass over.

There is another advantage in this arrangement, and that is that all the wear is on the casting D and none whatever on the axle, which, under the present plan, has to be renewed every six or ten months, while in my improvement the axles will last indefinitely.

I claim as new and desire to secure by Letters Patent—

Placing the wheels B on the axle between two flanges or bearings, $a\ b$, secured tightly on the axle, the flange or bearing $b$ being provided with two journals, $c\ c'$, on the former of which the wheels are placed, and the latter fitted in the ordinary boxes, substantially as and for the purpose herein set forth.

HENRY HELM.

Witnesses:
FREDRICK HELM,
JOHN DYERS.